United States Patent
Good et al.

(10) Patent No.: US 9,560,415 B2
(45) Date of Patent: Jan. 31, 2017

(54) METHOD AND SYSTEM FOR INTERACTIVE SELECTION OF ITEMS FOR PURCHASE FROM A VIDEO

(71) Applicant: JAMBO ENTERPRISES INC., Calabasas, CA (US)

(72) Inventors: Martin J. Good, Calabasas, CA (US); Scott D. Guthrie, Malibu, CA (US); Timothy L. Page, Shanghai (CN); Wei Huang, Shanghai (CN)

(73) Assignee: TapShop, LLC, Calabasas, CA (US)

( * ) Notice: Subject to any disclaimer, the term of this patent is extended or adjusted under 35 U.S.C. 154(b) by 0 days.

(21) Appl. No.: 14/163,271

(22) Filed: Jan. 24, 2014

(65) Prior Publication Data

US 2014/0215529 A1 Jul. 31, 2014

Related U.S. Application Data

(60) Provisional application No. 61/756,560, filed on Jan. 25, 2013.

(51) Int. Cl.
| | |
|---|---|
| *H04N 7/16* | (2011.01) |
| *H04N 21/4725* | (2011.01) |
| *H04N 21/254* | (2011.01) |
| *H04N 21/478* | (2011.01) |
| *H04N 21/858* | (2011.01) |

(52) U.S. Cl.
CPC ...... *H04N 21/4725* (2013.01); *H04N 21/2542* (2013.01); *H04N 21/47815* (2013.01); *H04N 21/8583* (2013.01)

(58) Field of Classification Search
CPC combination set(s) only.
See application file for complete search history.

(56) References Cited

U.S. PATENT DOCUMENTS

| | | | |
|---|---|---|---|
| 6,223,215 B1* | 4/2001 | Hunt et al. | 709/217 |
| 7,139,813 B1 | 11/2006 | Wallenius | |
| 8,213,916 B1 | 7/2012 | Yankovich et al. | |
| 8,458,053 B1* | 6/2013 | Buron et al. | 705/27.1 |
| 8,813,132 B2* | 8/2014 | Andrews et al. | 725/60 |
| 2002/0133817 A1* | 9/2002 | Markel | 725/23 |

(Continued)

FOREIGN PATENT DOCUMENTS

WO  WO 2010/054222 A1  5/2010

OTHER PUBLICATIONS

"eCommerce Ideas: Using Live Product Links Within Videos & Product Demos," eCopt on Jan. 14, 2008, 3 pgs., http://ecommerceoptimization.com/ecommerce-business/ecommerce-ideas-using-live-product-links-within-videos-product-demos/.

(Continued)

*Primary Examiner* — Chenea Smith
(74) *Attorney, Agent, or Firm* — Prol Intellectual Property Law, PLLC; H. Kenneth Prol

(57) ABSTRACT

A computer-implemented method comprises displaying a video episode via a display screen, identifying, via a processor, the video episode with a unique play identifier, tracking, via the processor, an image of a shopable item in the displaying video, and linking a display screen coordinate location of an interactive tap zone with the image of the shopable item during the video episode. The interactive tap zone is selected to indicate selection of the tracked shopable item and the processor associates the selection with the unique play identifier.

20 Claims, 8 Drawing Sheets

(56) References Cited

U.S. PATENT DOCUMENTS

| | | |
|---|---|---|
| 2003/0028873 A1* | 2/2003 | Lemmons .................. 725/36 |
| 2004/0098747 A1 | 5/2004 | Kay et al. |
| 2008/0109851 A1* | 5/2008 | Heather et al. ............. 725/60 |
| 2009/0138906 A1 | 5/2009 | Eide et al. |
| 2012/0084811 A1 | 4/2012 | Thompson et al. |
| 2012/0167145 A1 | 6/2012 | Incorvia |
| 2012/0210369 A1 | 8/2012 | Sakhartov et al. |
| 2012/0233646 A1 | 9/2012 | Coniglio et al. |
| 2012/0254932 A1 | 10/2012 | Hudson et al. |
| 2012/0272268 A1 | 10/2012 | McCarthy, III |

OTHER PUBLICATIONS

"ConciseClick—Clickable Video Made Easy," 2007-2012 ClearMedia, 6 pgs., http://conciseclick.com/.

"Point | Click | Purchase—the world's first video embedded e-commerce solution," Interactive Video Innovations (IVI), http://www.ivitv.co/purchase.html.

"An interactive Video System supporting ECommerce," Balfanz et al., Product Placement, MIV 2001, 1 pg., http://citeseer.ist.psu.edu/viewdoc/summary?doi=10.1 .1.67.3305.

\* cited by examiner

METHOD AND SYSTEM FOR INTERACTIVE SELECTION OF ITEMS FOR PURCHASE FROM A VIDEO

CROSS-REFERENCE TO RELATED APPLICATIONS

This application claims priority to U.S. Provisional Patent Application No. 61/756,560, entitled "Method and System for Interactive Selection of Items for Purchase from a Video," filed on Jan. 25, 2013, which is assigned to the current assignee hereof and is incorporated herein by reference in its entirety.

FIELD OF THE DISCLOSURE

The present disclosure generally relates to facilitating electronic commerce via selection of items during viewing of an online video on a merchant website and providing data and purchase options for the items selected during viewing of the video, and more particularly relates to setting up and managing interactive selection of items in online videos.

BACKGROUND

Recent developments in the evolution of e-commerce web activities include more emphasis on video presentation to emphasize and provide concise yet in-depth presentation of products and services available via the internet. E-commerce web activities, along with social networking tools, provide merchants with an ability to share information with multiple individuals and to broadcast information about themselves and their goings-on. Multi-media information can be transmitted, via a multitude of electronic data methods to mobile devices, smartphones, tablets, smart TV's, computers, and other electronic means able to present video and other internet access to customers.

The transmission of informatics often takes place across a network that can include the Internet which connects servers and databases containing information of individuals, products and organizations.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Figure 1:
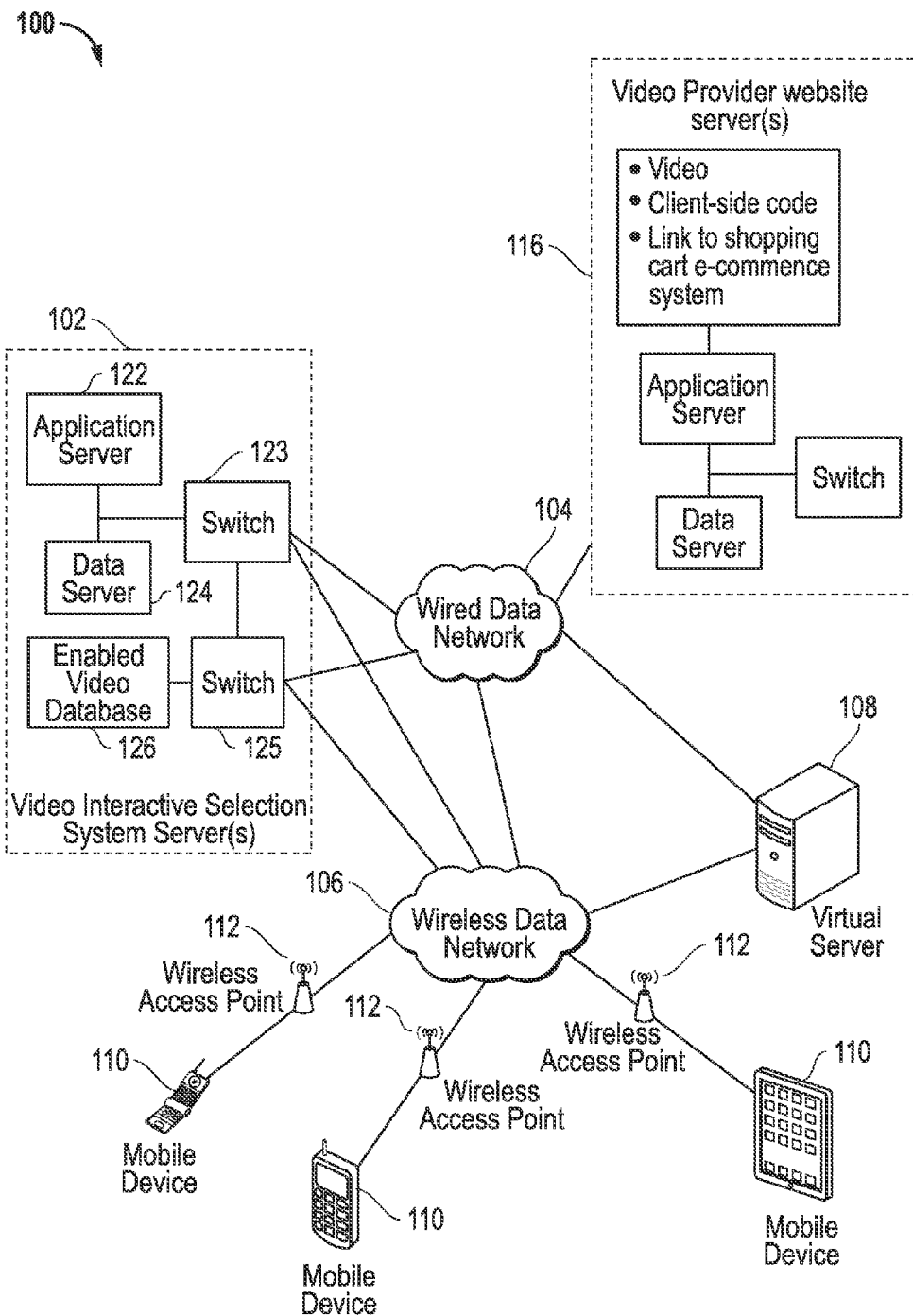
FIG. 1 is a block diagram illustrating an embodiment of a network including servers, personal computer, and mobile devices that may be used to perform the methods and implement the video interactive selection system described herein.

A video interactive selection system is described that comprises a system of servers and databases connected to a network that can host the video interactive selection system, host the website providing a video to be enabled with the system, and be accessed by a user such as a consumer interested in the desired video. In this way, the video interactive selection system facilitates electronic commerce between a provider of access to a video and users of the video. In an example embodiment, the provider may be an advertiser or merchant seeking to promote products via video and the user may be a potential consumer of those products. The video provider offers access to a video containing viewable items that show, promote, or describe one or more products. The video may be a specifically created advertising video, or may be a video provided for other purposes but one that contains images of various products for promotion. The video interactive selection system permits a video provider to have touchscreen or clickable feedback on items shown in the video while the video is being viewed. The video interactive selection system links the selection feedback with the selected items shown in the video. Data related to the item selection is collected for the selected item and the selected item and related data are pushed to a tap cart system in real time while the video continues to play. The tap cart may be viewable simultaneously with the video in a different portion of the screen, or may be viewed after the video ends. The tap cart system preserves the selections made during the video. With the tap cart system, video play is uninterrupted while shopping for items shown in the video. While the selected shopable items, and their related data are pushed to the tap cart for current or later viewing, the user experience with the video shopping is uninterrupted and may be enhanced with providing additional helpful information about the shopable item while the video can continue to play. Previous systems stop the video and, in many cases, hyperlink the user to another location to view information about the selected items from a video. The selected items in the tap cart may then be forwarded to and purchased using a shopping cart system used by the video provider, advertiser, or merchant to sell to consumers. This allows the consumer to purchase the items after the video has concluded or upon selecting an option to immediately view the tap cart.

In one embodiment, the video provider creates and stores a profile to utilize and access the video interactive selection system via a computer connected to the network. The profile may include video provider identification and account data. It may also establish login or verification credentials of me video provider for administrative access to the video interactive selection system. This access may relate to one or more video advertising campaigns utilizing videos for promotion. To set up and enable a video with the video interactive selection system, the advertiser's website page and IP address where the desired video is made available is registered in addition to identifying information about the video. Then the video to be enabled is uploaded to the video interactive selection system. The entire video is scanned to identify items in the video that may be shopable items. Shopable items are items shown in the video that may be available for sale during the video pursuant to a video advertising campaign. The shopable items, upon identification, are tracked in the video via coordinates in the video frames where they appear and timestamp data identifying the progression of video frames. In other words, at any given time point in a video, the system will identify the coordinates of a zone of the shown video where each item is located at that point. This tap zone becomes the potentially interactive zone in the video and is continuously tracked around the shopable item as the video progresses as long as the shopable item appears in the video.

The video interactive selection system administrator, video provider, or advertiser may control whether shopable items are activated for touch, click, or other interaction with the played episode of the video. With activated tap zones, the shopable items in the video are saleable items. Otherwise, the system mutes or may not accept interaction at a tap zone. For example, an out of stock item may not be activated for interactive feedback in a video. Alternatively, some items may be designated differently than others. Control over the video interactive selection system may determine if an item selected during a video playback is pushed to a tap cart, or to a shopping cart, or alternatively, information about the product is simply provided in another format to the user. Nonetheless, an item in a video that is activated as selectable via interactive feedback is considered a saleable item, although it does not necessarily mean the item is pushed to a tap cart for viewing and later purchase. A shopable item may be saleable or not.

The video interactive selection system interfaces with a network 100, such as the Internet, that may include wired and wireless portions. FIG. 1 shows a block diagram for a network 100 for use in connection with the video interactive selection system according to one embodiment. Video interactive selection system host server 102 may include one or more servers for hosting portions of a video interactive selection system. For example, video interactive selection system host server 102 may include one or more application servers 122 and data servers 124 to operate the set-up, interface, control and data layers of the video interactive selection system. Server 102 may include database 126, such as an enabled video database containing identifying information for videos that are part of one or more video provider's portfolio of video campaigns. The data stored there may include specific video-related data including metadata about the video, tracking coordinate and timestamp information for shopable and saleable items in the video, data linking shopable or saleable items to selected data relating to those items, links tap cart system for viewing data and information about shopable items, links to e-commerce shopping cart servers associated with the products shown as shopable or saleable items, and social sharing network connections. Network 100 may include a wired data network 104 or a wireless data network 106. In an embodiment with a set of multiple servers as part of the video interactive selection system host server 102, the multiple servers, such as 122, 124 and database 126 may be coupled to the wired data network 104 or wireless data network 106 via a switch or switches 123 and 125 or some other interface. The video interactive selection system host server 102, including one or more servers such as 122 and 124 and database 126, hosts at least portions of the video interactive selection system 102 described herein. The video interactive selection system described is implemented in software limning on the computer hardware, including processors and memory, that comprise any of the servers or the databases depicted at 102. The video interactive selection system host server 102 may be coupled to a wired 104 or wireless data network 106 that can be a global network, a wide area network, a local area network, WiFi networks, WiMAX networks, Bluetooth networks, WiLAN networks, CDMA, TDMA, or other types of cellular networks, or other version of network. In an example, this can include all or some portion of the Internet. The network system 100 may include one or more mobile devices 110 via wireless access points 112. The overall network system 100 can include a virtual server 108 that can couple the wired data network with the wireless network and serve a system or data base function from a remote location other than video interactive selection system host server 102 or video provider website server 116.

A video provider website server 116 is connected to wired data network 104 or wireless network 106. The video provider website server 116 may host video provider's website and may host the video showing items to be promoted or for sale. Alternatively, the video may be hosted via a remote website server (e.g., virtual server 108) elsewhere in the network 100 and linked to video provider website server 116. Video provider website server 116 may also host client side code to enable the video with the video interactive selection system. Additionally, the video provider website 116 may host an e-commerce shopping cart system in one embodiment for purchase of merchandise via the internet. However, the video provider and the merchant selling the items shown in the video may not be one and the same. In an alternative embodiment, the e-commerce shopping cart system may not be hosted by the video provider website 116, but may simply link to the shopping cart hosted remotely at virtual server 108 or even at the video interactive selection system host server 102.

A consumer device 114 may be coupled to wired data network 104 or the wireless data network 106 as well. The consumer device 114 may be used to connect to the video provider website at video provider website 116 to view the video. Consumer device 114 has known interactive capabilities as a touchscreen, touchpad, mouse, trac-ball, or other device permitting interaction with locations on a display. Moreover, the consumer device may be used to purchase a selected device. In one embodiment purchases may be made with an e-commerce shopping system hosted by a merchant, advertiser, video provider, or via remote third party hosting.

The video interactive selection system may consist of several software code components to be executed by processors on computing systems in network 100. For example, host servers for the video interactive selection system 102, or host servers for the video-providing website 116, or consumer devices 114 may store or run components of the video interactive selection system code. Client side code is one component of the video interactive selection system. In one embodiment, the client side code consists of a small bundle of processor executable code generated by the video interactive selection system that is embedded in the webpage that hosts or makes the video available. The client side code embedded in the video website server 116 enables the website hosting the video to utilize the remainder of the video interactive selection system features. Upon embedding client side code with the website where the video is made available, the user's browser at 114 will be pointed to where to go and what to get to implement the video interactive system upon a user opening the webpage with the video at video website server 116. With the client side code embedded, the video is considered to be enabled with the video interactive selection system. The client side code may identify the IP address of the host servers for the video interactive selection system 102 to access the video interactive selection system. The client side code may also identify the video provider, the enabled video file, and server side script associated with the enabled video. Certain verification credentials may also be included to enable secure communication with the host servers for the video interactive selection system 102. In one embodiment, the client side code is HTML code or similar type of code to be embedded in the video provider's webpage.

The user's browser on the user computing system 114 will be directed to retrieve server side script to implement the functionality of the video interactive selection system and its set-up, interactive capability, data collection, data coordination, and communication functions. The server side script is a set of coded instructions and data associated with an enabled video and stored on servers hosting the video interactive selection system 116. In one embodiment, the server side script may be a Javascript or similar language script as known in the art. Part of the server side script may be sent from the servers hosting the video interactive system 102 to the browser as a plug-in for the user's browser. In one embodiment, this plug-in is temporarily downloaded to the user's browser 114 and removed or unloaded after the user leaves the website providing the enabled video or closes the browser. Alternatively, it could be a more permanently downloaded plug-in.

Upon loading the server side script collects information about the user including the user's IP address, browser type, date and time to identify the user and the interaction. Additionally, a unique identification number may be assigned by the server side script to the played episode of the video. This data, along with shopping data captured during playback of the video are communicated to the video interactive selection system hosting servers or associated databases 102. The server side script contains video-related metadata or may access the data and instructions on the video interactive selection system host servers 102 for additional data relating to the video episode playback. The video-related data or metadata of the server side script may include identification of shopable items, identification of those shopable items that are saleable items, coordinates and timestamps for locating shopable items in the video, and a tap zone for accepting touch or click input around the saleable items.

In one embodiment, the server side script plug-in or the related server side code and data available from the video interactive selection system servers 102 provides an overlay on the playing video that acts like a transparent layer on top of the playing video. The overlay provides coordinates over the video playback image to detect the location of the touch or click feedback on a tap zone for an item in the video. A timestamp of the video frame may also be recorded at the moment of the touch or click feedback at a tap zone. The transparent layer overlays, for example, a video playback window. The overlaying coordinate fields on the video do not interfere with the video playback. Thus the tap zones for the shopable items in the video may be selected by touching or clicking on coordinates in the overlay. The one or more shopable items and related information about the shopable item may be placed in a tap cart for current or later viewing by the user without pausing or freezing the video playback experience or linking to another page with information about the shopable item. The tap zone selections may be whisked off to appear in a tap cart while the video continues to play. In embodiments where the tap cart is viewable simultaneously with the ongoing video playback, multiple selected shopable items can be viewed and investigated in the tap cart without pausing the video. Information and images of the shopable items may be available with the server side script plug in, or may be accessed from another source. These information and images are prepared for presentation to the user in the tap cart concurrently with the video or after the video has played. Therefore, the user's video shopping experience is improved by avoiding disjointed linking to another site or pausing of the video playback while providing substantial additional information about the shopable item featured in the enabled video.

The server side script may receive the coordinates touched or clicked on the overlay during playback of a video enabled with video interactive selection system. This tap zone feedback data, along with the timestamp indicating the frame progression of the played video when a selection was made, are stored at the video interactive selection system hosting servers 102 for record keeping. It is understood, that any portion or all of the above recited functions or data, including metadata, may be part of the server side script plug-in retrieved by the user's browser. Alternatively, some or any of the functions or data recited above may be retained at the video interactive selection system hosting servers 102 in server side code residing there. Additionally, it is contemplated that any of the functions or data may reside in both locations or may be hosted in a separate virtual server environment as necessary.

In one embodiment, certain playback controls are available to the user along with the server side script that enables control of the playback. For example, pause, rewind, fast-forward, and skipping ahead or back one or more frames at a time are available playback controls. The transparent overlay provided by the server side script is synched up with these navigation controls. Skipping back three frames also moves the overlay tap zones accordingly to correspond with the tap zones for shopable items found in that time-stamped frame. Similarly, skipping ahead, rewinding and fast-forwarding by the user to a frame is synched in the transparent overlay so that the tap zones cover shopable items appearing in the video frame shown.

Figure 2:
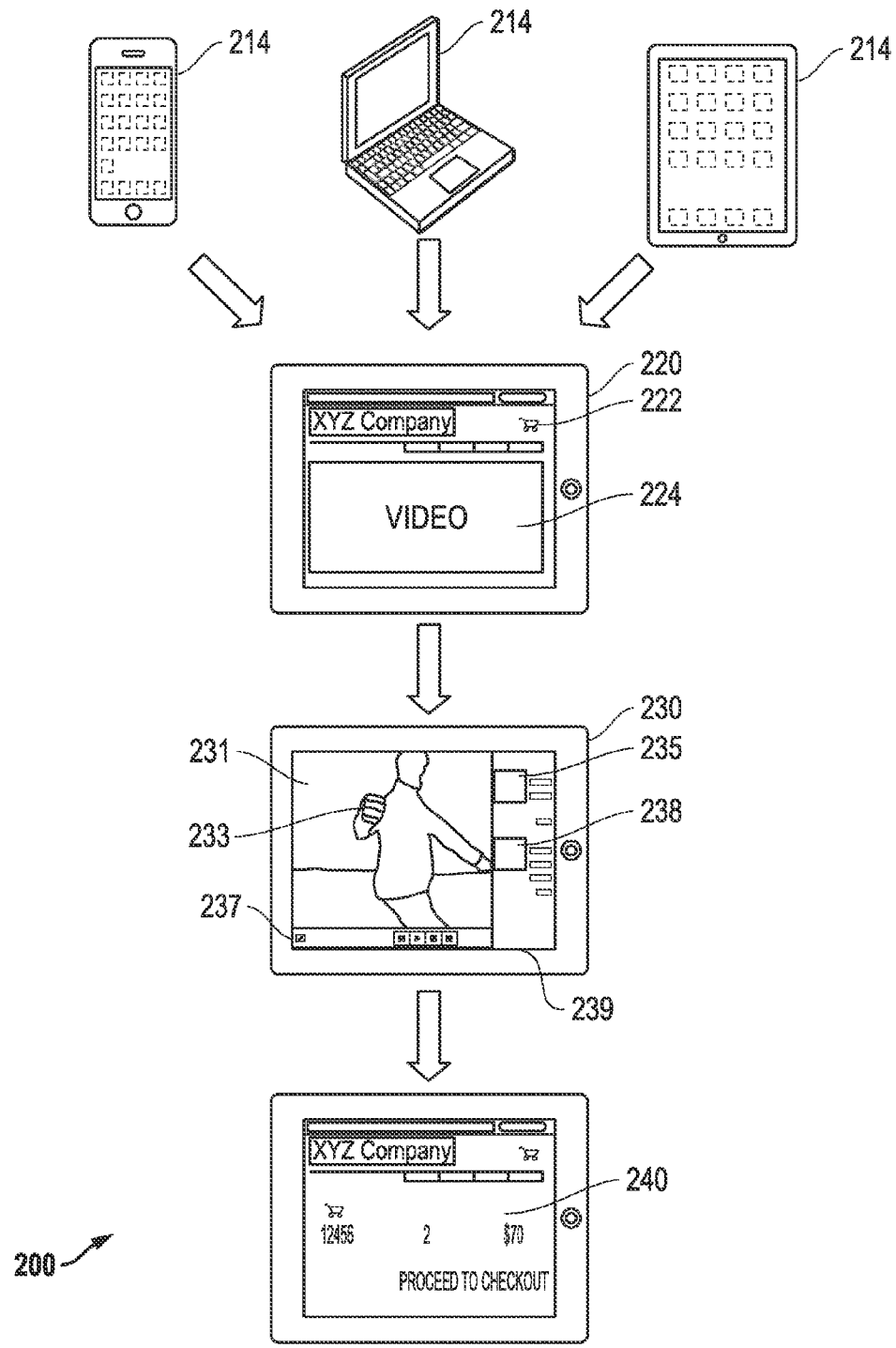
FIG. 2 is one example of graphical user interface illustrating mobile computing system devices displaying progressive stages of a website implementing features of an embodiment of the video interactive selection system described herein.

In an embodiment depicted in FIG. 2, the graphical user interface 200 is shown in progressing stages of implementation of an embodiment of the video interactive selection system on a commercial website of a video provider. The graphical user interface 200 may be displayed, for example, by the commercial website on a variety of mobile computing devices 214. Shown in the FIG. 2 embodiment, examples may include a smartphone, laptop, or tablet computing system 214 as shown.

The graphical user interface shown in 220 is a screenshot of the components of a video provider's website viewed by a user. In the shown embodiment, the website is displayed using a tablet computing system 214. At 222, a link is shown to a shopping cart system for enabling online purchasing. At 224, a video box is shown for displaying the video on the website with other available website functionality still accessible. The video box may display a promotional or other video that is enabled with the video interactive selection system. Video may be enabled by having embedded client side code that can initiate the video interactive selection system. Also shown are the browser bar, company identification, and other options to search or navigate the website.

In an alternative embodiment, a more full-screen video may be shown as with the graphical user interface depicted in 230. At 231, the video display is shown. In this embodiment, a video is shown playing that includes a shopable item 233 in the video. As above, this embodiment shows the website displayed using a tablet computing system 214 having touchscreen functionality. The shopable item 233 is depleted in one frame of the video. The coordinates on the video display portion of the website display are touchable if the item is a saleable item. The coordinates follow the saleable item as it moves with the video. Touching the saleable item 233 indicates via the overlay to the video interactive selection system a desire to shop for or purchase the item. In one embodiment, the video interactive selection system receives the touchscreen or click feedback and associates it with the coordinates at the time-stamped frame in the video. This associates the touchscreen feedback with the selected saleable item. The video interactive selection system places the identified item in a tap cart and may place additional product information in the tap cart as well. At 235, the present embodiment shows a tap cart alongside the larger video display. The selected saleable item is placed in the tap cart and may include a variety of preference selectors such as color options, size options, patterns, technical capabilities, flavors, reviews, similar product offerings, or other product specifications and options. In the graphical user interface website depicted at 230, additional functionality is shown including video play modes and controls at 237. Video play modes may include fall screen mode showing no auxiliary functionality of the website for shopping except the video display 231. Other play mode options may allow for more auxiliary functionality to be displayed along with the displaying video such as any combination of 235, 237, 238 and 239 shown in 230 or other features not shown in 230. Some play modes may include showing annotations over the video at points during playback describing features of the saleable items or special offers for the items (not shown). Video controls 237, such as play, pause, fast-forward, rewind, skip ahead, or skip back, may be provided for the user. These control the video playback and the video interactive selection system synchs the overlay with the video based on timestamp progression of the video identifying the frame. At 238, the video website may provide capability to share and post information about the saleable item or the video itself via social media outlets such as Facebook®, Twitter®, Pinterest®, tumbler® or similar social media outlets. Depicted at 239 of the video website user interface, the user may opt to leave the video and proceed to checkout from a shopping cart system to purchase items selected from the video. It is contemplated that some or all of the functionality shown in 230 may not appear in the various video display modes. At the graphical user interface depicted at 240 and hosted by the video provider, advertiser or merchant for the saleable items, a shopping cart system is run to provide for purchase of the products selected. The shopping cart 240 may provide detailed data on the selected saleable items as well as price, tax, shipping costs or other data to enable purchase of the saleable item as is known in the art. The shopping cart 240 also may provide links to additional, detailed information, reviews, or pictures of the saleable items. The shopping cart 240 collects data, such as option selections, quantity, payment or shipping information.

Figure 3:
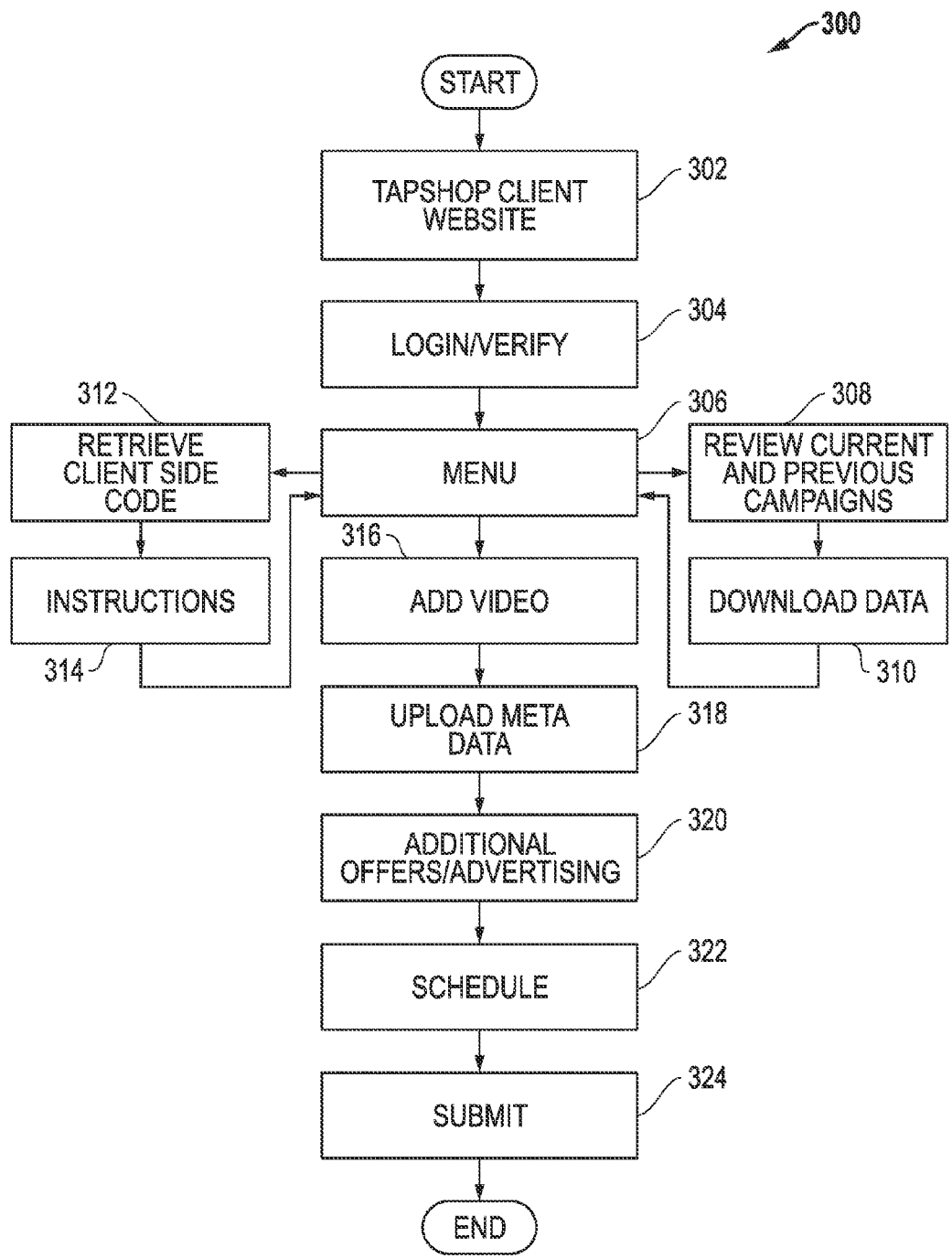
FIG. 3 is a flow chart illustrating one embodiment of creating a video interactive selection system enabled website and features therein.

FIG. 3 shows a flow chart illustrating the exemplary method of submitting video interactive selection features for a video to be played on a website and promoting one or more saleable items. A video interactive selection system campaign management platform provides an interface for a video provider to upload a video and data about the video and the shopable items in the video. The video may be part of an advertising or other promotional effort on behalf of a merchant. In an example embodiment, the video plays from a video provider's website. The video interactive selection system features are enabled for the video. The video interactive selection system gives a consumer or user a way to directly shop for and select items shown in the playing video. In this way, a merchant or advertiser may promote saleable items via video with actively-selectable items. The video interactive selection system may also set up a tap cart for viewing the selected saleable items and related information while the video plays or after the video has played. From the tap cart system, a transaction to purchase an item may occur by pushing the saleable item from the tap cart to a shopping cart upon request by a consumer.

A merchant or advertiser may manage a campaign for saleable items via the video interactive selection system campaign management platform hosted on the video interactive selection system's host servers. The video provider may control and customize what saleable or shopable items are promoted and shown in a video and what information associated with those items is made available during a select periods of time. The merchant or advertiser submits data relating to the items, purchase requests, and special offers for saleable items with the video interactive selection system.

The process to submit a video and data and to manage video campaigns 300 in the present embodiment begins at 302 where a video provider website accesses a video interactive selection campaign management platform operating on servers hosting the video interactive selection system. If one does not previously exist, a video provider profile may be created and sent to the set of servers hosting the video interactive selection system. The video provider profile includes identifying information about the provider, the campaign, and the video.

The process continues to block 304. At 304, a login or other verification is required to access one or more video promotion campaigns managed via the video interactive selection system. The video interactive selection system campaign management platform provides a separate web interface to the video provider to access and control over aspects of submitting the video and related data. The video provider may input the video, information related to saleable items in the video, or manage one or more enabled video promotional campaigns via a web interface.

The video provider website hosting the video to be enabled with the video interactive selection system is added to a campaign list associated with the video provider's login/verification data.

At 306 a menu web interface for the video interactive selection system campaign management platform is presented. The video provider may manage the one or more video campaigns associated with a video provider account via the web interlace menu. This menu includes options to review current and previous campaigns at 308, initiate retrieval of client side code and server side script at 312, or upload a video 316 to the video interactive selection system for processing and enabling the video interactive selection system features and services.

At 308, the video provider may view current and previous video campaigns for saleable items. The status of the campaigns may be selected and features of the current campaigns may be modified as desired. In one embodiment, saleable items may be modified to shopable items and the tap zone for touch or click feedback may be muted. This may occur, for example, if certain items are out of stock. Alternatively, touch or click feedback on such out-of-stock items may not place the item in a shopping cart for purchase but instead result in access to additional data about the product including ordering and backlog status for the product. In another example, shopable items are activated as saleable by the video provider resulting in unmuted touch or click feedback tap zones in the video. The video interactive selection system may have collected data about user activities during shopping. That stored data, along with campaign results data associated with an enabled video, may be viewed at 308. The user activity data may include information such as time and date video was viewed, locations from which a video was viewed using geo location data and IP addresses of users, social media activity by the user, selection activity of saleable items versus actual purchases, and other recorded information. Further examples of data may include such information as an overall count or frequency of video views, how often individual saleable items in the video are selected, how often individual saleable items are purchased, average prices paid for saleable items, selections or purchases data associated with specials ran for saleable items, as well as other information.

At 310, campaign information or data may be downloaded by the video provider. After downloading or viewing the campaign related information, the video provider may return to the menu 306.

At 312, previously submitted videos for a campaign may have client side code and server side script or other similar code available to enable the video interactive selection system services for a website video. Instructions for implementation of client side code and preparing server side code for use with viewers of the video are provided at 314. The process of generating client side code and server side script for a video involves several steps involving the handling and processing of the video and associated data using a video sweep tool described further below. This process begins at 316 with submission of the video for the promotional campaign to the video interactive selection system campaign management platform. The menu interface of the video interactive selection system campaign management platform presents the option to load a video at 306.

Upon uploading the video, various metadata are uploaded relating to the video at 318. Some of the meta-data relates to identification of shopable items shown in the video. Metadata uploaded with the video can also include information such as video length, format, ownership, and copyright information. Uploaded metadata associated with shopable and saleable items may include product images, product information, price, product criteria, product name, promotional information and other annotations promoting the shopable or saleable item. Other metadata associated with the video can also be generated by the video sweep tool described further below. For example, metadata generated by the video sweep tool may include timestamp data for each identified shopable item. The timestamp data indicates when shopable items appear in the video. Other examples generated by the video sweep tool include coordinates associated with the timestamp information. These coordinates give the location of shopable items in the video at various points during the video playback. In one embodiment the shopable items in the video may also be allocated as saleable items in the metadata. Further relevant metadata determined for the enabled video by the video sweep tool may include a tap zone created for each saleable item corresponding to the timestamped frames and coordinate data for the saleable item in the video. In an embodiment, this tap zone is made part of an overlay on the video display window or screen so when it is touched or clicked the saleable item in the video is selected. The tap zone may track the shape of the item as it appears in the video or may be a circular, square, rectangular or other shaped area in the vicinity of the saleable item. This touchscreen or clickable feedback may be recorded by the video interactive selection system daring playback of a video episode.

At 320, the video interactive selection system campaign management platform provides for input of special offers and additional advertising for the saleable items in the video. For saleable items, special offers may be made during playback of the video. Alternatively, additional advertising may be provided drawing attention to saleable items in the video. This may include annotations requested by the video provider to appear in the video to highlight special offers on saleable items.

At 322, scheduling data is submitted to the video interactive selection system campaign management platform. A schedule may control the enabled video playback, or special offers and advertising in the enabled video. Depending on anticipated levels of product inventory at points during the campaign, a schedule may set dates and times that the enabled video may be available for playback or what items in the video are saleable. The schedule may, for example, alter the saleable status of one or more items in the video based on given dates and times of availability of those items. Scheduling may also be set relating to the when special offers and additional advertising are available during video playback to influence sales. At 324, the video campaign data including the video, metadata, and the schedule are submitted to the video interactive selection system campaign management platform for video sweeping by the video sweep tool. The video interactive selection system campaign management platform may then generate client side code and server side script to be associated with the video. Upon generation of this client side code and server side script, that code may become available in the menu 306 for retrieval at 312. Alternatively, the code may become available via email notification (not shown). Additionally, database storage is made available for collection of campaign related data collected.

Figure 4:
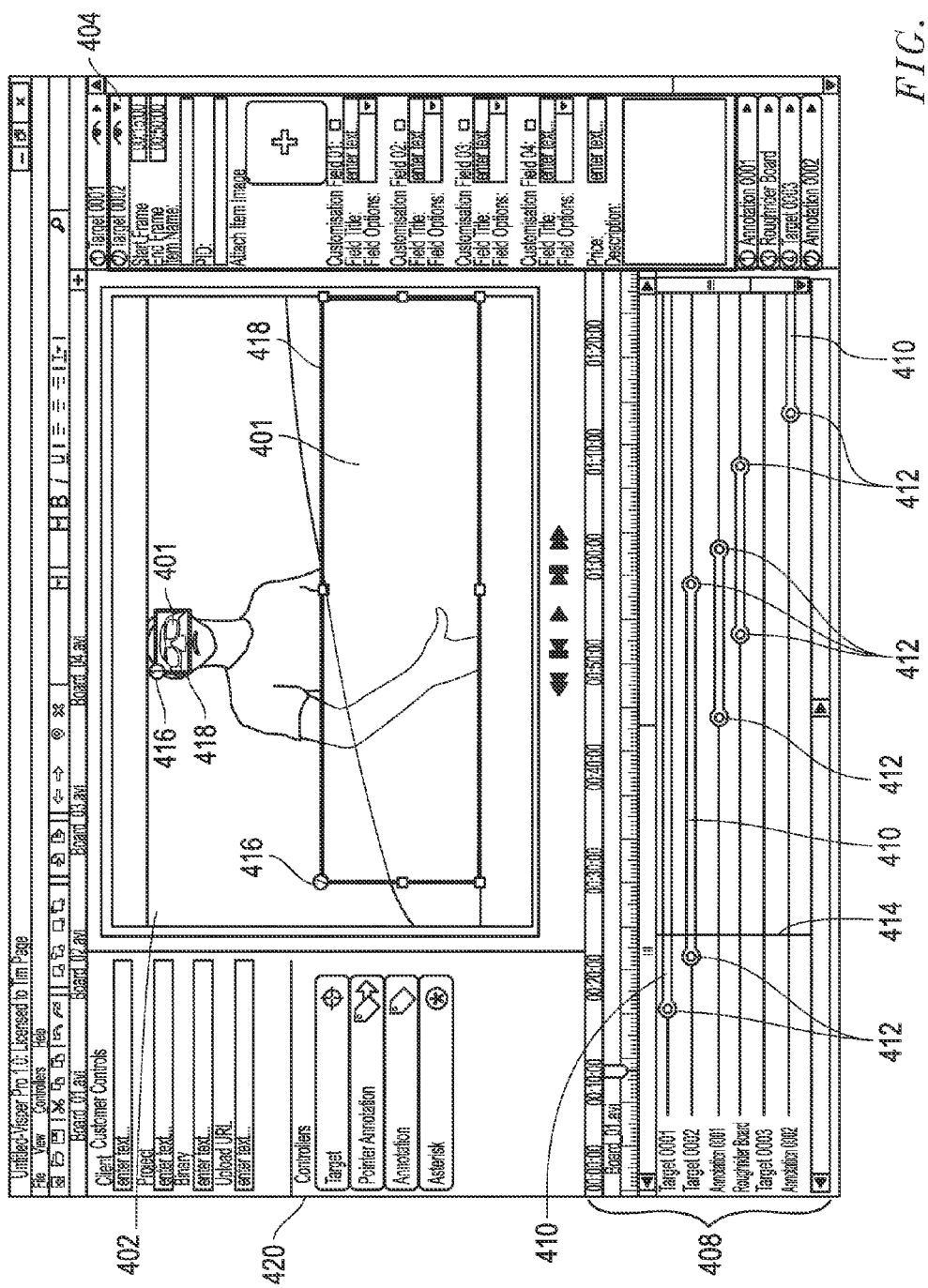
FIG. 4 is an example illustrating a graphical user interface with a video sweep tool in accordance with one embodiment of the video interactive selection system described herein.

FIG. 4 shows a graphical user interface 400 for a video sweep tool. The video sweep tool may be part of the video interactive selection system campaign management platform or a separate portion of the video interactive selection system. The video sweep tool applies tap zones to the video, registers the video as enabled with the video interactive selection system, and creates client side code and server side script. This graphical user interface 400 provides access to tools for enabling a video with video interactive selection features via the video sweep tool. The video frames 402 are shown in one part of the graphical user interface 400. The video sweep tool identifies shopable and saleable items 401 in video frames 402. It also locates coordinates in the frames displaying the shopable or saleable item image locations through various techniques. This may be done by using the target control 420 and identifying a coordinate location 416 on the video box 402. Coordinate values in the video box 402 are determined by the size of the video. In an example, if a video is 720×480 pixels, the video box may be broken up into 720×coordinates and 480 Y coordinates. The dimensions may alter depending on the video. This X and Y coordinate system defines an overlay on the video. As described above, the overlay coordinate dimensions are also used later daring playback. Identification of a coordinate location 416 at a frame timestamp may be referred to as defining a key frame. A tap zone may be determined by using the controller function 420 to define a zone of coordinates around a shopable item in the video box. The tap zone, in an example embodiment, may be defined by the location coordinates 416 and then the height and width of a touchable box on the overlay of the video frame. More than one tap zone may be identified for a shopable item in the video box 402 and implemented in the overlay. For some shopable item images, this may be necessary to make the tap zone easy to interact with.

Key frames for two or more points in the video showing a shopable item may be used to define start and end points of a smooth transition of the shopable item in the video. With the start and end points of a smooth transition, the coordinates 416 for the timestamp points of frames in between may be generated and stored by the video sweep tool. This is discussed in more detail below with respect to FIG. 5.

In another embodiment, pixel tracking or image recognition techniques may be used to identity a shopable item in frames of the video and the location coordinates of the items in certain frames. First, the video sweep tool may use pixel tracking or image recognition algorithms to identify frames in the video containing shopable items 401. Pixel tracking involves taking a sample of pixels from a shopable item image(s) having defining colors and contrast. By comparing the video frames with one or more pixel samples from a shopable item images, the video sweep tool can identify that the shopable item 401 appears in the video frames.

In an alternate embodiment image recognition techniques would involve using multiple sample images of a shopable item to create a computational 3D mesh of images for the shopable item from several angles. With a computational 3D model of the shopable item, a match may also be searched on a frame-by-frame basis in the video. Image recognition may, in this case, have a higher degree of accuracy but such a technique may also take greater computational resources. The sample images used in pixel tracking or image recognition may be taken from frames in the video being enabled to create the library of sample images for image recognition or pixel tracking.

In a further embodiment, the image recognition or pixel tracking algorithm may identify not just the frames, but the location coordinates 416 of the recognized shopable item image 401 in the frames. Upon identifying a match in the frame, the system identifies one coordinate point 416 on the recognized matching image in the frame. This coordinate point 416 is associated with the shopable item 401 and will appear on the video frame or an overlay of the video frame.

Image recognition or pixel tracking may be blended with key frame identification and using smooth transition calculations. The image recognition or pixel tracking may identify key frames at the start and finish of a smooth transition. Then the coordinates between the start and end of the smooth transition may be generated for the interim frames. The coordinates 416 identified by the video sweep tool may be just a single point 416, but the video sweep fool may also be used to assign or identify a tap zone of coordinates 418 and depict the zone in the frame or an overlay of the video box 402. The tap zone of coordinates 418 is also associated with the recognized shopable item 401 image and may follow the image coordinates 416 through the frames to generate tap zone coordinates for frames. In one embodiment, this tap zone may be a rectangle or square of coordinates of a fixed minimum size automatically assigned around, or near, the single coordinate points 416 identified on the recognized shopable item 401 in each of the frames 402. In another alternative embodiment, assessment of the tap zone of coordinates 418 for the shopable items 401 may be input for a frame via the video sweep tool interface by identifying a box or geometric shape of a tap zone 418 near the recognized borders of the shopable item within the video frame image.

In another embodiment, identifying any coordinates associated with the shopable item may be input via the video sweep tool interface. A target identification function 420 allows for a shopable item 401 in a video frame to be identified by coordinates 416. A box or tap zone 418 of any geometric shape may be formed or modified around the identified shopable item 401 in the frame. Identification or editing of coordinate locations 416 or tap zones 418 is made via controller functions 420 and clicking or touching portions of the video box 402 that depict the shopable item 401 to mark a coordinate point 416 on the video frame or an overlay of the video frame 402. The video sweep tool interlace permits substantial flexibility in customizing the data and instructions for enabling the video interactive selection system to be used with the video. With any of the automated techniques above, the video sweep tool graphical user interface 400 may be used to edit and update the coordinate 416 and tap zone 418 definitions with control tools 420 in video box 402.

The video sweep tool interface 400 additionally permits annotation of one or more frames of a video for internal commenting and addition of metadata at various points in the video. This annotation tool 404 also permits addition of special offers, product name, advertisements, purchase boxes, or other features displayable during playback, of an episode of the enabled video.

The video sweep tool interface 400 provides video controls 406 such as play, pause, fast forward, rewind, forward frame and reverse frame to navigate the video and enabling controls for given frames. The video controls advance or rewind the video frames. The video controls also keep the video in sync with the enabling data and control for the overlay.

A time axis 408 on the video sweep tool displays the video start to finish running time or some portion thereof. The time axis 408 also shows the timestamp of the frame in the progression of the video. The time axis 408 may also list shopable items 401. The shopable items 401 each have a timebar 410. Timebar 410 shows duration of the appearance of the shopable item in the video. The start times and end times of the shopable item's appearance or appearances in the video are shown with an end marker 412 at each end of the time bar 410. The timebar 410 indicates the range of timestamp data for the appearance of each shopable item 401 in the video frames. These start times and end times may be customizable by moving the end markers 412 to the appropriate frame time slot in the time axis 408. A visual indicator 414, such as a line through the time axis indicates which timeslot corresponds to the currently viewed video frame in the video box 402.

Annotation via the annotation tool 404 permits identification of the shopable item 401, attachment of an external image, copying a cropped image from the video frame 402 for later use, or entry of customized fields for description or advertisements of the shopable item 401. For identified coordinates 416 or tap zones 418 associated with the image of a shopable item 401 in video frame 402, preset metadata information about a shopable item may be used to populate the fields of the annotation tool 404. This preset information is customizable for the frame via the annotation tool 404. The shopable item 401 is then linked to the corresponding timebar 410 or a timebar 410 is created for the shopable item if one has not been established.

Figure 5:
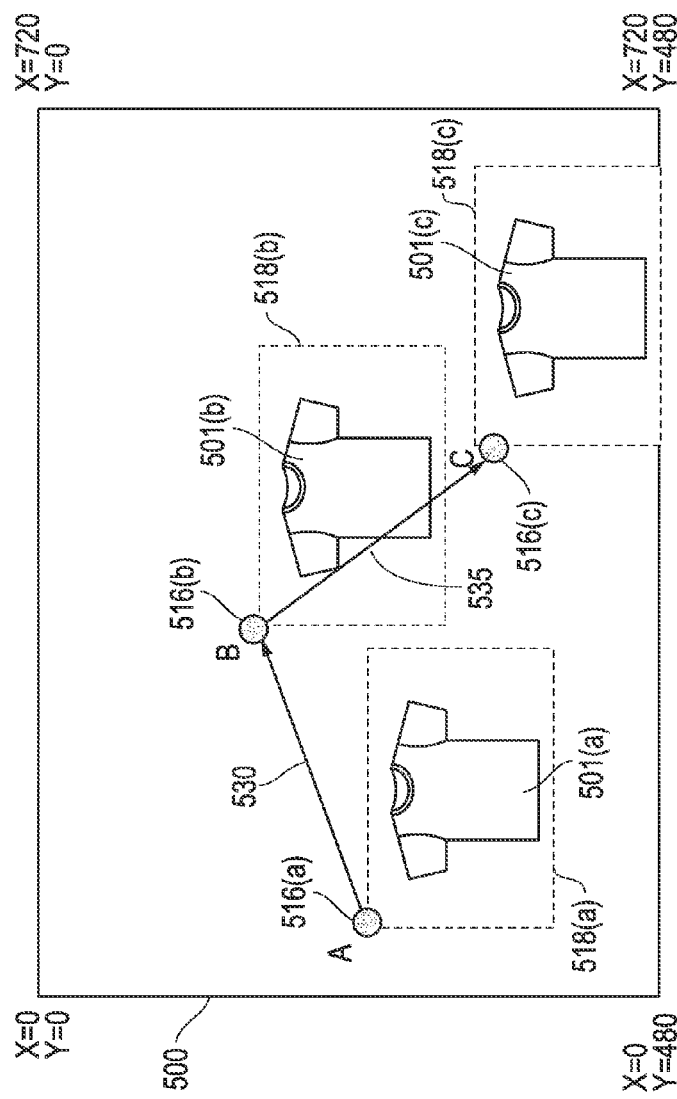
FIG. 5 is another example video display in a graphical user interface of a video sweep tool depicting key frames and smooth transitions of a shopable item in a video.
Figure 5:
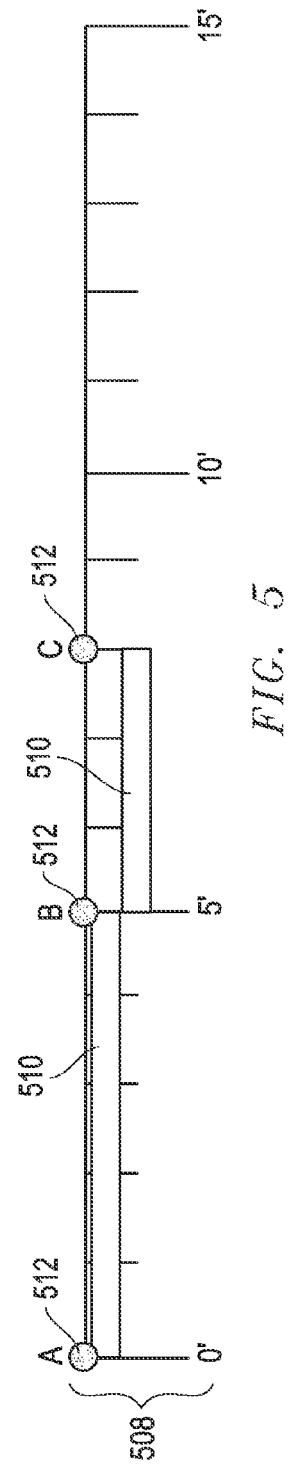

FIG. 5 depicts a video in a video box with X and Y coordinates 500. In this embodiment, the video dimensions are 720×480. An example shopable item 501(a), 501(b), and 501(c) is shown at three timepoints as it moves to the right and down in the video. A time axis 508 is depicted below the video. The three timepoints A (=0), B (=5), and C (=8) show separate frames of the video. A and B are 5 seconds apart. B and C are 3 seconds apart. Three key frame coordinate locations 516(a), 516(b), and 518(c) for the shopable items are shown as well. The X and Y coordinate values change between timepoints A, B, and C as shown by the three key frame coordinate locations 516(a), 516(b), and 516(c). Three box tap zones 518(a), 518(b), and 518(c) are also depicted as overlaying the shopable items 501 at those key frames.

The shopable item 501 may be identified by the video sweep tool on the three frames show. Then, key frames 516 and tap zones 518 are assigned to the three frames for timepoints A, B, and C using the video sweep tool. In the shown embodiment, the key frames 516 define the start and endpoints of two smooth transitions 530 and 535 representing movement by the shopable item 518 in the video. Smooth transition 530 occurs between timepoints A and B. Smooth transition 535 occurs between timepoints B and C.

The video sweep tool calculates coordinate points 516 for the shopable item 518 in the frames between timepoints A and B depending on the smooth transition 530. If the smooth transition 530 is a generally linear transition with a consistent speed of movement, then the video sweep tool calculates the coordinate points 516 for the frames between A and B using straight line calculation of coordinates between A and B. Afterwards, a standard-sized tap zone 518, similar to the tap zone 518(a) or 518(b), is placed over the shopable item 501 at each calculated interim coordinate point between A and B. If the shopable item image 501 changes in shape, these tap zones may be edited using the video sweep tool user interface.

In an alternate embodiment, the movement of shopable item 501 may start slow and speed up between A and B. The video sweep tool will use an ease-in calculation to draw a line of coordinates 516 on the interim frames between timepoints of the key frames. Slower movement at the beginning will not move the calculated coordinate points 516 for the earlier frames as far down the line 530 between 516(a) and 516(b) as it will for later frames where the shopable item moves faster. Similarly, for movement that starts fast and slows down, an ease-out calculation may be done that moves the coordinate calculation along the line more quickly at the beginning and more slowly for the later frames between 516(a) and 516(b). Similar smooth transition calculations may be made between any two key frames defining the endpoints, for example A to B or B to C.

In yet another embodiment, the smooth transitions between A and B or B and C may not be linear, but curved. An automatic Bezier calculation of a smooth parametric curve may be used to place a curved line of coordinates between timepoints A and B. The Bezier curve may be altered to fit the movement of the shopable item 501 with the video sweep tool. In another alternate embodiment, the movement curve may be manually estimated with full curve control using on screen controls to shape the estimated curve of movement between key frames A and B. With the coordinate point 516 curve between key frames A and B or B and C, the coordinates of the shopable item 501 in the interim frames may be calculated. Then, a tap zone 518 of standard size may be applied to the coordinates 516 of the interim frames. With these techniques, the coordinate points 516 are automatically extrapolated using key frames coordinate points 516(a), 516(b), and 516(c). The tap zones 518 are also automatically assigned to interim frames between 518(a) and 518(b). Adjustments may be made using the video sweep tool as necessary. Thus, the video sweep tool may be used to set up automatic identification of image locations 516 of shopable items 501 throughout the frames of the video.

As a result of enabling a video with the video sweep tool, the system associates the video and related metadata for the video in the video interactive selection system for use with an enabled video campaign for the video provider. Metadata includes identification of shopable items within the video, their location in the frames of the video, and whether those shopable items are active as saleable items. Additional metadata as described above relating to the shopable items is also saved. This information may be saved in a document file format. The video file, the video interactive selection system file features, the metadata files, and the data collection locations may be identified for the enabled video. The system may then generate a client side code to activate the video interactive selection system and access these various files. The system may also generate a server side script stored at the video interactive selection system host servers and associated with the enabled video. This server side code is utilized by the user's browser to permit interactive selection-enabled playback of an episode of the video by the user.

Figure 6:
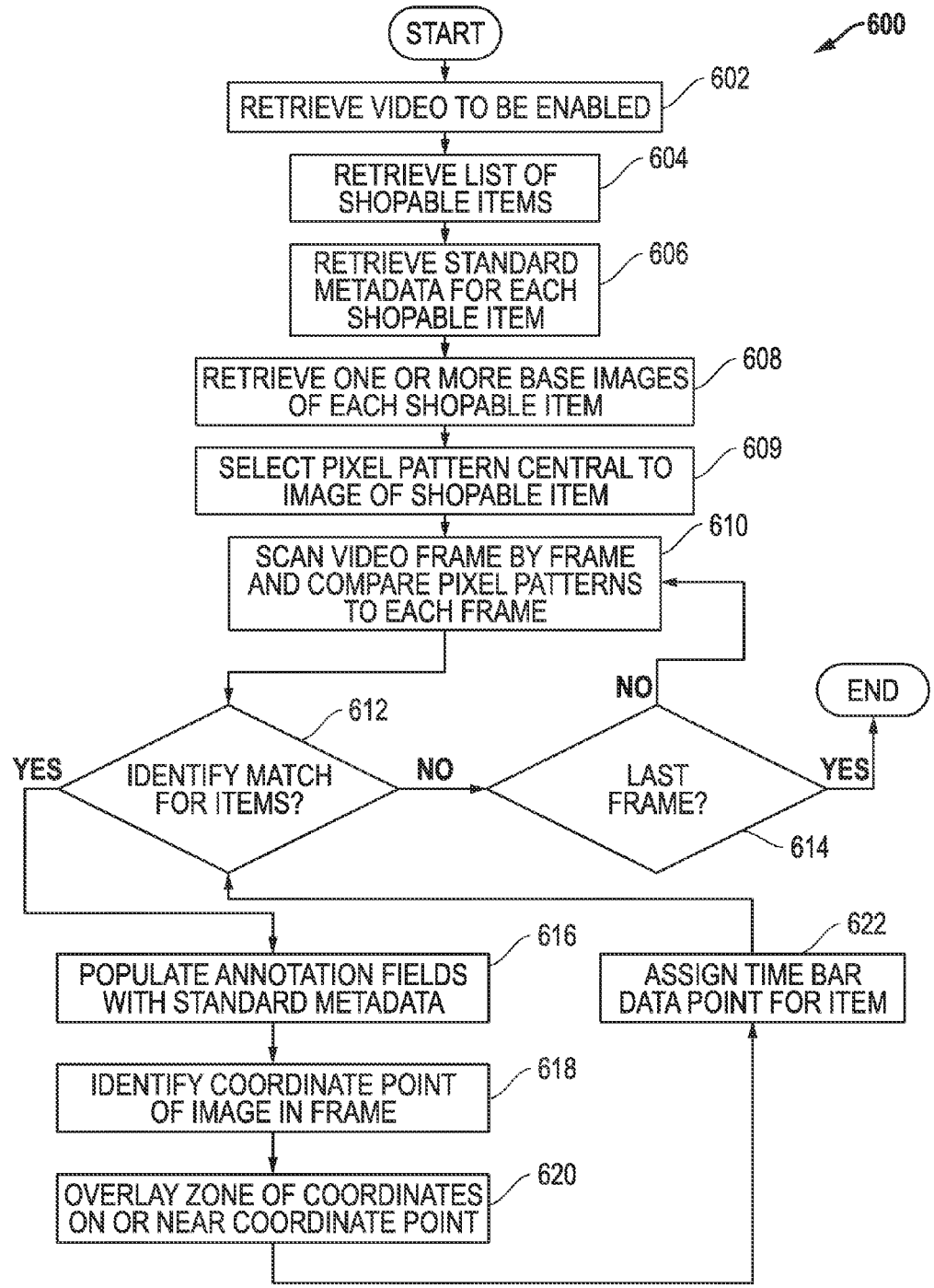
FIG. 6 is a flow chart illustrating one embodiment of creating a video interactive selection system enabled video and features therein with a video sweep tool.

FIG. 6 shows a flow chart illustrating the exemplary method of enabling video with video interactive selection features via a video sweep tool. The process 600 begins at 602 where the video sweep tool retrieves the video and data uploaded by a video provider using the campaign management interface described with FIG. 3. Proceeding to 604, a list of saleable and shopable items depicted in the video is retrieved from data provided by the video provider. For each saleable or shopable item, a set of standard metadata submitted by the video provider is retrieved by the video sweep tool at 606. The standard metadata in one embodiment is the information that a video provider desires to be associated with each shopable item, using the campaign management interface described in FIG. 3. For example, it will include descriptive information about the shopable item and may include the name of the shopable item, options relating to the shopable item, price, and functional descriptions.

The process continues at 608, where one or more base images of each shopable item are retrieved by the video sweep tool. The base images may have been uploaded to the video interactive selection system campaign management platform or may be images taken from select video frames by the video sweep tool one or more base images create an image library for the shopable item. The base images may be used for comparison to recognize and identity shopable item images in video frames or manually selected. Image recognition or pixel tracking may also be used during the comparison stage. Alternatively, the base images may be used for promotion purposes, for example dining checkout.

At 610, the set of servers hosting the video sweeper module of the video interactive selection system compare each frame of the video to identifying pixel patterns from one or more base images for each shopable item. Identifying pixel patterns with recognizable colors or shading may be selected for use in pixel tracking and stored with the image library. Image recognition algorithms may be used in an alternate embodiment to detect images and match them with computational model of a shopable item based on images from the library of shopable item images. The video sweeper module comparison operation may be adjustable to reflect how close a match is required. For example, if many sample identifying pixel patterns are available for a shopable item and they are taken from sample frames of the currently analyzed video, then a higher correlation for matching may be used in the comparison at 610. Setting the matching correlation level may be used to optimize the correlation and reduce false identified images in frames or missed images in frames.

At 612 of the embodiment depicted in FIG. 6, the method determines if a match has been found for a frame of the video. If no match is found at 612, the process proceeds to determine if the last frame in the video has been reached at 614. If so, the process ends. If the last frame has not been reached, the process returns to 612 to compare pixel patterns or computational models from base images of shopable items to another frame of the video.

Upon finding a match in 612, the system associates the shopable item matching the pixel pattern or base image in that frame. The process proceeds to 616 where the annotation fields shown in the video sweeper interface at 404 are populated by a standard set of metadata previously uploaded with the video. The standard set of metadata relates to the shopable item identified. Proceeding to 618, a set of coordinates 416 are located for the shopable item image in the video frame. In one embodiment, upon recognition of a matching image in a video frame, the video sweeper module estimates the center of the shopable item image. That center point is correlated with coordinates on the overlaying grid. Borders of the matching shopable item image are identified in the frame. Based on the approximate borders, a center point of the image may be selected as a coordinate point for the shopable item.

With identified coordinates for the shopable item in the frame of the video, the video sweeper module may overlay a tap zone of coordinates around the identified coordinates. The tap zone of coordinates may define a tap zone of any geometric shape as described above. The tap zone of image coordinates may be of a standard size or customized for each shopable items. For example, the standard tap zone of coordinates for sunglasses 401 will likely be smaller than the tap zone of coordinates for a surfboard 401 shown in the video frame 402 of FIG. 4. These coordinate tap zones may be customizable however using the controller functionality 420 of expanding or contracting the tap zone by dragging a zone border in the video sweep tool graphical interface 400 as described above.

At 622, the video sweeper module assigns a timebar 410 entry in the time axis 408 for display with the video sweeper module interface depicted in FIG. 4. Of course, the steps described above in FIG. 6 do not necessarily need to proceed in the order described. For example, the population of annotation fields, identification of coordinates, overlay of a tap zone of coordinates, and assignment of a timebar may occur in any order. Furthermore, identification of matches in video frames at 610 may proceed in a number of ways. In one embodiment the video sweeper module may focus on one shopable item at a time for each of the frames of a video and then repeat comparing to each frame for the next shopable item on a list. In an alternative, the video sweeper module may assess each frame for all listed shopable items seeking a match to pixel patterns of base image models before moving on to the next frame.

It is contemplated that the video sweeper module interface of FIG. 4 may be used as described above after a sweep as described above for FIG. 6 to edit, correct, or modify the enabled video profile created by the video sweeper module. Correction of errors such as missed frames containing shopable item images may be filled-in by defining each side of the gap as a start and end key frame according to the extrapolation techniques described above. The automatic extrapolation to fill-in interim frames may infer from nearby frames the existence of the shopable item image in interim frames. Additionally, tap zones of coordinates for tap zones may be modified to more readily fit the images of shopable items in frames and avoid overlapping tap zones of coordinates for multiple shopable items. Misidentified matching images of shopable items may also be cancelled for frames of the video.

Figure 7:
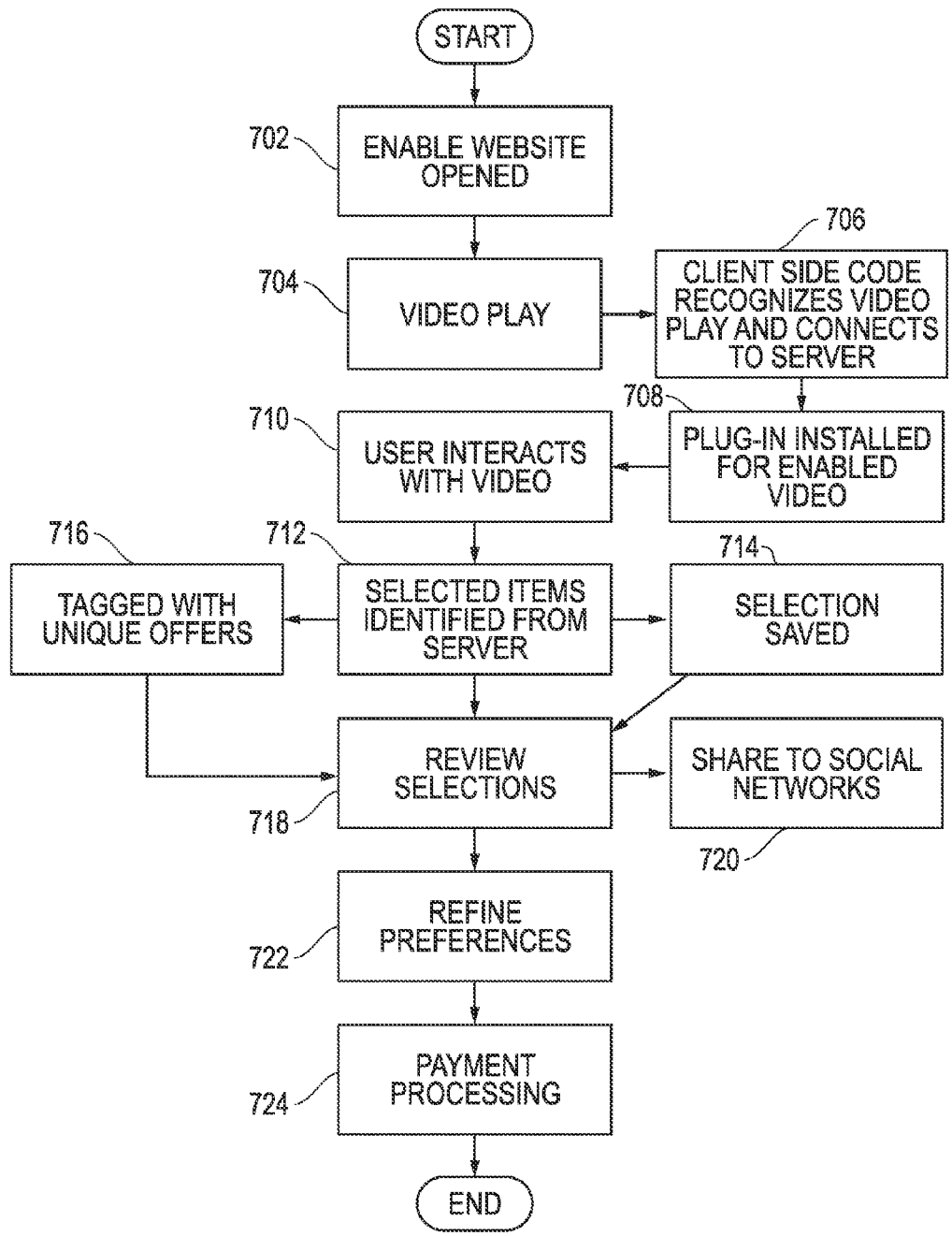
FIG. 7 is a flow chart illustrating one embodiment of interacting with and utilizing a video interactive selection system enabled website and features therein.

FIG. 7 shows a flow chart detailing a process 700 for utilization of a video enabled to utilize the video interactive selection system disclosed herein. Process 700 also depicts the process for collecting interactive feedback and data from the user or consumer viewing the enabled website video. The process 700 begins at 702 where a consumer accesses an enabled website of a video provider. Upon viewing the video provider website, the process proceeds to 704 where the user may select the video to play. The client side code recognizes the play command and connects to the video interactive selection system host server at 706. The video interactive selection system installs a plug-in or similar code at the browser of the user at 708. The plug-in is the server side script as described above enabling the video interactive selection system to playback an episode of the video.

At 710, the user interacts with the video by clicking or selecting a saleable item in the video. The tap zone provides feedback for comparison to metadata indicating coordinates and the timestamp of the saleable items in the video. The touch feedback timestamp from the played video episode indicates the frame. The touch or clicked coordinates in the frame where feedback was provided yields the saleable item selected. The saleable item selected is identified by cross-referencing to the database information about the enabled video that indexes the coordinates of the timestamped frame where the saleable item image is located. At 712, the selected saleable items are identified on the video interactive selection system server. Proceeding to 714, the selection is saved at the video interactive selection system server. Additionally, identifying the saleable item on the server may trigger linking unique offers for the user at 716. The unique oilers may arise based on a calendar or time schedule set in the video interactive selection system for the saleable item.

Each of the feedback interactions to the video interactive selection system server are saved at 714. Data relating to the selected saleable items, such as product options and price, are gathered from the video interactive selection system database. The saleable items selected and information related to those items are gathered and pushed to a tap cart or other presentation forum for review by the user at 718. In one embodiment the saleable items selected are reviewed after the video has concluded. In other embodiments, the user viewing the video has an option to simultaneously view a tap cart to investigate the selected saleable items and purchase the items if desired.

At 720, the user has an option to share the selections and information about the selected items as well as links to the video via social network feeds. The tap cart or review forum may be hosted on the servers hosting the video interactive selection system, or on the video providers website. The process proceeds to 722 where the user may research and refine preferences for the selected items. This may include selecting sizes, colors, features, quantities, promotional offers or other options. These steps 710-722 may occur without interruption of the video playback experience as described in more detail above.

If a saleable item is selected for purchase, the user may be linked to a merchant shopping cart. The shopping cart for execution of a purchase may be hosted on the video provider website or another website, for example a remote website or the site of a merchant. At 724, the shopping cart processes payment to finalize the purchase and the process ends.

Figure 8:
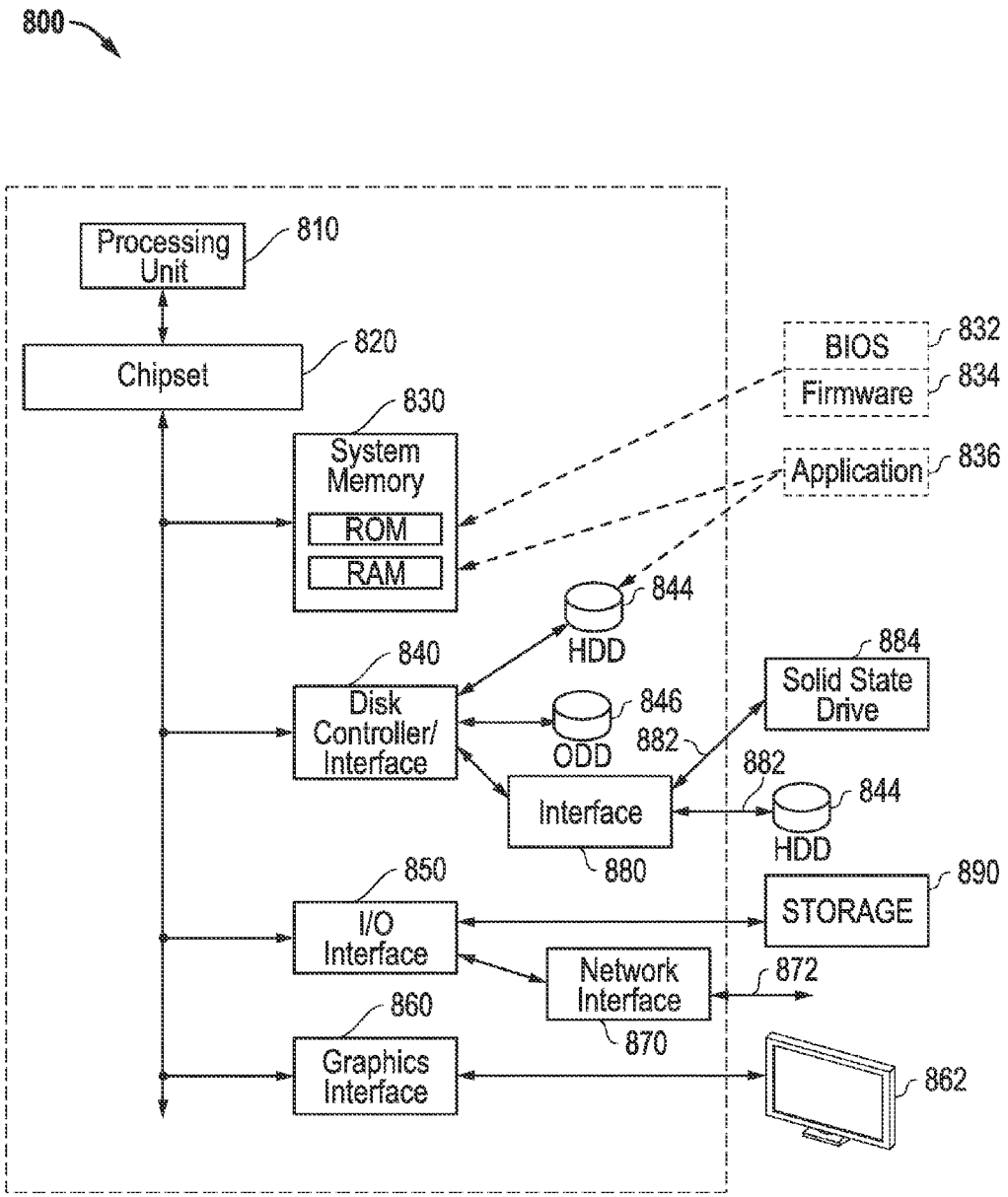
FIG. 8 is a block diagram illustrating an embodiment of servers, personal computers, mobile devices, or other computing system architecture that may be used to perform the methods and implement the creation and use of embodiments of the video interactive selection system described herein.

FIG. 8 is a block diagram illustrating an embodiment of a computer or server system 800, including a processing unit 810, a chipset 820, a system memory 830, a disk controller/interface 840, an input/output (I/O) interface 850, graphics interface 860, and a network interface 870. In a particular embodiment, the computer or server system 800 is used to carry out one or more of the methods described herein. In another embodiment, one or more of the computer or server systems described herein are implemented with a storage database to host the video interactive selection system, to host the video provider website with client side code, and to carry out the methods described herein.

Chipset 820 is connected to processing unit 810 via a bus or other channel, allowing the processing unit to execute machine-executable code. In a particular embodiment, computer or server system 800 may include one or more processing units. Chipset 820 may support the multiple processing units and permit the exchange of data among the processing units and the other elements of the computer or server system. A bus or other channel permits the system to share data among the processing unit, the chipset, and other elements of computer or server system 800.

System memory 830 is connected to chipset 820. System memory 830 and chipset 820 can be connected via a bus or other channel to share data among the chipset, the memory, and other elements of computer or server system 800. In another embodiment, processing unit 810 may be connected to system memory 830. A non-limiting example of system memory 830 includes static random access memory, dynamic random access memory, non-volatile random access memory, read only memory, flash memory, or any combination thereof.

Disk controller/interface 840 is connected to chipset 820. Disk controller/interface 840 and chipset 820 can be connected via a bus or other channel to share data among the chipset, the disk controller, and other elements of computer or server system 800. Disk controller/interface 840 is connected to one or mote disk drives. Such disk drives may include an internal or external hard disk drive (HDD) 844, and an optical disk, drive (ODD) 846, and can include one or more disk drives as needed or desired. ODD 846 can include a Read/Write Compact Disk (R/W-CD), a Read/Write Digital Video Disk (R/W-DVD), a Read/Write mini Digital Video Disk (R/W mini-DVD), another type of optical disk drive, or any combination. Additionally, disk controller 840 is connected to disk interlace 880. Disk interface 880 permits a solid-state drive 884 or external HDD 844 to be coupled to a computer or server system 800 via an external interface 882. External interface 882 can include industry standard busses such as a Universal Serial Bus (USB), IEEE-1394 Firewirep, or other proprietary or industry-standard busses. Solid-state drive 884 can alternatively be disposed within the computer or server system 800. Any of the above drivers, individually or in combination, may save as the database storage for the merchant forum system.

Alternatively, network links may connect to off-site memory or storage devices to save data as part of a merchant forum system database.

I/O interface 850 may include an I/O controller and is connected to chipset 820. I/O interface 850 and chipset 820 can be connected via a bus or other channel to share data among the chipset, the I/O interface, and other elements of computer or server system 800. I/O interface 850 is connected to one or more peripheral devices via possible intermediate channels and devices. Peripheral devices can include devices such as including a keyboard, mouse, or storage systems 890, graphics interfaces, network interface cards 870, sound/video processing units, or other peripheral, devices. Network interface 870 includes one or more network channels 872 that provide an interface between the computer or server system 800 and other devices that are external to computer or server system 800. This includes an interface between the computer or server system 800 that may host the merchant forum system and various wired and wireless networks connected to the mobile devices or computers of consumer members and merchants for executing the methods and system described herein.

Graphics interface 860 is connected to chipset 820 via a bus or other channel which permits exchange of data among the chipset, the graphics interface, and other elements of computer or server system 800. Graphics interface 860 is connected to a video display 862.

Computer or server system 800 includes Basic Input/Output System (BIOS) 832 and firmware code 832, and one or more application programs 836. BIOS code 832 functions initializes the computer server system 600 on power up to launch an operating system, and to manage input and output interactions between the operating system and the other elements of the computer or server system. In a particular embodiment, the BIOS 832 and firmware code 834 and application programs 836 are stored in memory 830. The BIOS code 832, firmware 834 and application programs 836 include machine-executable code that is executed by processing unit 810 to perform various functions of computer or server system 800. In another embodiment, the BIOS code 832, firmware 834, and application programs 836 are stored in another storage medium of computer or server system 800. The BIOS code 832, firmware 834, and application programs 836 can each be implemented as single programs, or as separate programs to implement the methods and merchant forum system described herein. The machine executable code used to execute the computer implemented method steps and create the merchant forum system described herein are examples of application programs 836 in the described embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The numerous innovative teachings of the present application will be described with particular reference to the exemplary embodiments. However, it should be understood that this class of embodiments provides only a few examples of the many advantageous uses of the innovative teachings herein. In general, statements made in the specification of the present application do not necessarily limit any of the various claimed inventions. To the contrary, the description of the exemplary embodiments are intended to cover alternative, modifications, and equivalents as may be included within the spirit and scope of the invention as defined by the claims. Moreover, some statements may apply to some inventive features but not to others.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A computer-implemented method comprising:
    displaying a video episode via a display screen;
    identifying, via a processor, each instance of video playback for the video episode with a unique play identifier;
    tracking, via the processor, an image of a shopable item in the displaying video;
    linking a display screen coordinate location of an interactive tap zone with the image of the shopable item during the video episode,
    wherein linking the display screen coordinate location of the interactive tap zone with the image of the shopable item during the video episode further includes tracking the coordinate location and timestamp data on a frame by frame basis as the video episode progresses; and
    saving selection of the tracked image of the shopable item for association with the unique play identifier via a video interactive selection system that hosts or links to a shopping cart platform to reflect a purchase option for the shopable item after the video playback for the episode is ended,
    wherein the interactive tap zone is selected by touching or clicking on the coordinate location on the display screen to indicate selection of the tracked image of the shopable item during the instance of video playback for the episode and the selection is associated with the unique play identifier, and
    wherein the shopable item and related information about the shopable item is placed in a shopping cart of the shopping cart platform without pausing the video playback.

2. The computer-implemented method of claim 1, further comprising:
    receiving touch screen input from the interactive tap zone associated with the tracked image of the shopable item during display of the video; and
    displaying shopping data for the tracked shopable item on the display screen in response to receiving touch screen input during display of the video.

3. The computer-implemented method of claim 2, wherein the displayed shopping data includes price, features and options for the tracked shopable item.

4. The computer-implemented method of claim 1, wherein the interactive tap zone is disabled for the shopable item during display of the video to make the shopable item unselectable.

5. The computer-implemented method of claim 1, further comprising:
    sending data to a server indicating that the shopable item was selected; and
    connecting the processor to an e-commerce infrastructure related to the shopable item selected.

6. The computer-implemented method of claim 5, wherein the e-commerce infrastructure includes the shopping cart platform and purchase options displayed on the display screen during the playback of the video episode.

7. The computer-implemented method of claim 1, wherein the display screen displays the e-commerce infrastructure including a shopping cart platform and purchase options for the selected shopable item after the video episode is ended.

8. The computer-implemented method of claim 1, further comprising:
    tracking, via the processor, a plurality of images of shopable items in the displaying video; and
    linking a plurality of display screen coordinate locations for a plurality of interactive tap zones with each respective image of the shopable items during the video episode.

9. A non-transitory computer-readable medium including machine executable code for carrying out a method, the method comprising:
    displaying a video episode via a display screen;
    identifying, via a processor, each instance of video playback for the video episode with a unique play identifier;
    tracking, via the processor, an image of a shopable item in the displaying video;
    linking a display screen coordinate location of an interactive tap zone with the image of the shopable item during the video episode,
    wherein linking the display screen coordinate location of the interactive tap zone with the image of the shopable item during the video episode further includes tracking the coordinate location and timestamp data on a frame by frame basis as the video episode progresses;
    receiving touch screen input from the interactive tap zone associated with the tracked image of the shopable item during the instance of video playback for the video episode; and
    transmitting data including selection of the tracked image of the shopable item for association with the unique play identifier to a video interactive selection system that hosts or links to an e-commerce shopping cart platform in response to receiving touch screen input during display of the video to reflect a purchase option for the shopable item after the video playback for the episode is ended,
    wherein the touch screen input from the interactive tap zone is selected by touching or clicking on the coordinate location on the display screen to indicate selection of the tracked shopable item and the selection is associated with the unique play identifier, and
    wherein the shopable item and related information about the shopable item is placed in a shopping cart of the shopping cart platform without pausing the video playback.

10. The non-transitory computer-readable medium of claim 9, the method further comprising displaying shopping data for the tracked shopable item on the display screen during display of the video in response to receiving touch screen input.

11. The non-transitory computer-readable medium of claim 9, wherein the interactive tap zone is disabled for the shopable item during display of the video to make the shopable item unselectable.

12. The non-transitory computer-readable medium of claim 9, the method further comprising:
connecting the processor to an e-commerce infrastructure configured for purchasing the shopable item selected.

13. The non-transitory computer-readable medium of claim 9, wherein the e-commerce infrastructure displays the shopping cart platform and purchase options on the display screen during the playback of the video episode.

14. The non-transitory computer-readable medium of claim 9, wherein the display screen displays the e-commerce infrastructure including a shopping cart platform and purchase options for the selected shopable item after the video episode is ended.

15. An video interactive selection system comprising:
a display screen for displaying a video episode;
a processor identifying each instance of video playback for the video episode with a unique play identifier;
the processor tracking an image of a shopable item in the displaying video;
the processor linking an interactive tap zone with a display screen coordinate location of the image of the shopable item during the video episode,
wherein linking the display screen coordinate location of the interactive tap zone with the image of the shopable item during the video episode further includes tracking the coordinate location and timestamp data on a frame by frame basis as the video episode progresses; and
the processor transmitting selection of the tracked image of the shopable item for association with the unique play identifier to a video interactive selection system that hosts or links to a shopping cart platform to reflect a purchase option for the shopable item after the video playback for the episode is ended,
wherein the interactive tap zone is selected by touching or clicking on the coordinate location on the display screen to indicate selection of the tracked shopable item during the instance of video playback for the episode and the selection is associated with the unique play identifier, and
wherein the shopable item and related information about the shopable item is placed in a shopping cart of the shopping cart platform without pausing the video playback.

16. The system of claim 15, further comprising:
the display screen displaying shopping data for the tracked shopable item on the display screen in response to receiving touch screen input during display of the video.

17. The system of claim 15, wherein the processor disables the interactive tap zone for at least one shopable item of a plurality of shopable items during display of the video to make the at least one disabled shopable item unselectable during a portion of the video playback.

18. The system of claim 15, wherein the display screen displays the e-commerce infrastructure including the shopping cart platform and purchase options for the selected shopable item during playback of the video episode.

19. The system of claim 15, wherein the display screen displays the e-commerce infrastructure including a shopping cart platform and purchase options for the selected shopable item after the video episode is ended.

20. The system of claim 15, further comprising:
a network interface sending data to a server indicating that the shopable item was selected; and
the processor connecting to an e-commerce infrastructure related to the shopable item selected.

* * * * *